United States Patent
Hambusch

(10) Patent No.: US 11,535,198 B2
(45) Date of Patent: Dec. 27, 2022

(54) FILLING APPARATUS FOR A VEHICLE, AND VEHICLE HAVING SUCH A FILLING APPARATUS

(71) Applicant: Bayerische Motoren Werke Aktiengesellschaft, Munich (DE)

(72) Inventor: Thorsten Hambusch, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/980,228

(22) PCT Filed: May 27, 2019

(86) PCT No.: PCT/EP2019/063688
§ 371 (c)(1),
(2) Date: Sep. 11, 2020

(87) PCT Pub. No.: WO2019/229003
PCT Pub. Date: Dec. 5, 2019

(65) Prior Publication Data
US 2021/0031728 A1 Feb. 4, 2021

(30) Foreign Application Priority Data
May 28, 2018 (DE) .................... 10 2018 208 398.3

(51) Int. Cl.
*B60S 1/50* (2006.01)
*B60K 15/05* (2006.01)

(52) U.S. Cl.
CPC ............ *B60S 1/50* (2013.01); *B60K 15/05* (2013.01); *B60K 2015/053* (2013.01)

(58) Field of Classification Search
CPC ...... B60S 1/50; B60K 2015/053; B60K 15/05
(Continued)

(56) References Cited

U.S. PATENT DOCUMENTS 1,825,134 A * 9/1931 Storms ................ B62D 25/105
                                                    180/69.2
3,583,513 A * 6/1971 Macadam ............. B60R 16/04
                                                    180/69.24
(Continued)

FOREIGN PATENT DOCUMENTS

DE      36 37 575 A1    5/1988
DE      195 46 085 C1   6/1997
(Continued)

OTHER PUBLICATIONS

International Search Report (PCT/ISA/210) issued in PCT Application No. PCT/EP2019/063688 dated Aug. 30, 2019 with English translation (six pages).
(Continued)

Primary Examiner — Timothy L Maust
(74) Attorney, Agent, or Firm — Crowell & Moring LLP

(57) ABSTRACT

A filling apparatus for a vehicle, in particular for a motor vehicle, includes a body flap, which forms an outer skin of the vehicle, at least in some sections, and is designed to be pivoted between a first position and a second position which is different from the first position. The body flap has an opening. A device opens and closes the opening by way of a pivotable cover element which is provided at the opening. A filler neck or a container, which is arranged in relation to the opening such that the filler neck or the container, or the container via the filler neck, can be filled with a fluid via the opening when the body flap is in the first position.

14 Claims, 2 Drawing Sheets

(58) Field of Classification Search
USPC .................................................. 141/311 R
See application file for complete search history.

(56) References Cited

U.S. PATENT DOCUMENTS

| | | | | |
|---|---|---|---|---|
| 3,743,045 | A * | 7/1973 | Hansen | ............ E05C 3/14 |
| | | | | 180/69.24 |
| 3,992,051 | A * | 11/1976 | Hitch | ............ B60K 15/05 |
| | | | | 296/97.22 |
| 5,658,036 | A * | 8/1997 | Benoist | ............ B60K 15/05 |
| | | | | 296/97.22 |
| 5,820,019 | A * | 10/1998 | Spitale | ............ A47G 29/1201 |
| | | | | 232/25 |
| 5,836,638 | A * | 11/1998 | Slocum | ............ B60K 15/05 |
| | | | | 296/97.22 |
| 6,193,093 | B1 * | 2/2001 | Brunner | ............ B60K 15/0406 |
| | | | | 220/234 |
| 7,677,631 | B1 | 3/2010 | Zischke et al. | |
| 2004/0256024 | A1 | 12/2004 | Schlachter | |
| 2012/0153600 | A1 * | 6/2012 | Rick | ............ B60R 21/20 |
| | | | | 280/728.2 |
| 2016/0087375 | A1 | 3/2016 | Yoshizawa et al. | |
| 2017/0137000 | A1 | 5/2017 | Huebner et al. | |
| 2017/0197515 | A1 * | 7/2017 | Southey | ............ B60L 53/16 |
| 2018/0009484 | A1 * | 1/2018 | Remes | ............ B60S 1/50 |
| 2019/0023126 | A1 * | 1/2019 | Khafagy | ............ E06B 3/38 |

FOREIGN PATENT DOCUMENTS

| | | | |
|---|---|---|---|
| DE | 197 36 329 A1 | 2/1999 | |
| DE | 102013214205 A1 * | 1/2015 | ......... H01R 13/5213 |
| DE | 10 2014 205 433 A1 | 9/2015 | |
| DE | 20 2016 106 334 U1 | 2/2017 | |
| DE | 10 2015 222 669 A1 | 5/2017 | |
| EP | 2 767 447 A1 | 8/2014 | |

OTHER PUBLICATIONS

German-language Written Opinion (PCT/ISA/237) issued in PCT Application No. PCT/EP2019/063688 dated Aug. 30, 2019 (five pages).

German-language Search Report issued in German Application No. 10 2018 208 398.3 dated Jun. 3, 2019 with partial English translation (12 pages).

* cited by examiner

FILLING APPARATUS FOR A VEHICLE, AND VEHICLE HAVING SUCH A FILLING APPARATUS

BACKGROUND AND SUMMARY OF THE INVENTION

The present invention relates to a filling apparatus for a vehicle, in particular for a motor vehicle, and to a vehicle having such a filling apparatus.

In conventional vehicles such as motor vehicles, filling apparatuses are known for example in the context of the filling of a wash water container of a conventional windshield washing system.

Generally, in conventional windshield washing systems, provision is made of a filler neck for the wash water container below a body flap, such as a vehicle front flap, or below an engine hood in the engine compartment.

Alternative designs provide the filler neck for example in a water channel of a rear flap of the vehicle. Further designs provide for filling of the wash water container via a hood gap for example between the engine hood and the fender.

If the vehicle has a front flap which is intended to be actuated only in a workshop by means of a special tool and which is largely referred to as a so-called "service flap", the filler neck of the wash water container is not readily accessible. The provision of visible individual flaps in body elements, which are subject to specific design requirements, is, for design and manufacturing reasons, generally avoided if this is possible.

DE 20 2016 106 334 U1 discloses a front grille emblem for unlocking a hood and filling a windshield washer fluid container via a windshield washer fluid collector. However, such a construction constitutes increased outlay in terms of manufacturing.

It is therefore an object of the present invention to provide a filling apparatus and a motor vehicle having such a filling apparatus, which are able to be produced with lower outlay in term of manufacturing than in the prior art.

This object is achieved by a filling apparatus and by a vehicle according to the independent claims. Advantageous configurations and refinements of the invention emerge from the dependent claims.

The filling apparatus according to the invention is provided for a vehicle, in particular for a motor vehicle, and comprises: a body flap, which at least sectionally forms an outer skin of the vehicle and is configured to be pivoted between a first position and a second position, which differs from the first position, wherein the body flap has an opening; a device for opening and closing the opening by way of a pivotable cover element provided at the opening; and a filler neck and/or a container, which are/is arranged in relation to the opening such that the filler neck or the container or, via the filler neck, the container, can be filled with a fluid via the opening when the body flap is situated in the first position.

Accordingly, filling of the wash water container is made possible in an extremely simple manner. According to the invention, not the pivotable body flap but merely the cover element needs to be actuated in order to carry out a filling process. Moreover, from a manufacturing aspect, the filling apparatus is extremely simple to produce and can be fitted in the vehicle without great effort.

The filling apparatus according to the invention may advantageously be designed such that the body flap is able to be pivoted between the first and second positions such that the body flap, in its first position, is placed in abutment with the filler neck and, in its second position, is remote from the filler neck. Here, the first position may correspond to a closed position if the body flap is in the form of a front flap or engine hood of the vehicle, while the second position may correspond to an open position in which access to the vehicle front or to the engine compartment is made possible.

Furthermore, the filling apparatus according to the invention may be refined such that the body flap is able to be pivoted between the first and second positions such that the body flap, in its first position, is placed sealingly in abutment with the filler neck.

Furthermore, the filling apparatus according to the invention may be designed such that the cover is fastened pivotably to the body flap, and the filler neck and the body flap are able to be fastened at the vehicle body side. Accordingly, when the body flap is pivoted from the first position into the second position, the cover element is moved along with the body flap, while the filler neck remains positionally fixed owing to its vehicle body-side attachment.

Furthermore, the filling apparatus according to the invention may be realized such that the cover and/or the filler neck are/is fastened pivotably to the body flap, and the body flap is able to be fastened at the vehicle body side.

Furthermore, the filling apparatus according to the invention may be realized such that, when the body flap is pivoted from the first position in the direction of the second position, the filler neck is moved along with the body flap, and/or, when the body flap is pivoted from the second position into the first position, the filler neck, by way of a lower end portion, comes into contact with an opening of the container in a sealing manner. The container and the filler neck are therefore designed as separate components, wherein the container is fastened to the vehicle body so as to be immovable in relation to the body flap, while the filler neck is connected fixedly to the body flap, with the result that, when the body flap is pivoted, the filler neck is moved along with the latter.

Furthermore, the filling apparatus according to the invention may be realized such that the device for opening and closing comprises a bearing arrangement, which pivotably mounts the cover element on the body flap.

Moreover, the filling apparatus according to the invention may be refined such that the device for opening and closing has a locking device, which is fastened to the filler neck and is configured to lock the cover element, situated in the position closing the opening, in the first position of the body flap. Preferably, the locking device is a type of push-push mechanism by which, by way of a push-action actuation of the cover element, respective locking and unlocking can be performed.

Furthermore, the filling apparatus according to the invention may be realized such that, in the position closing the opening, the cover element bears sealingly against the body flap.

Furthermore, the filling apparatus according to the invention may be designed such that an emblem is provided at an outer side of the cover element. In this way, the cover element can be concealed such that the body flap, in the form of a front flap or engine hood, readily meets design requirements.

Furthermore, the filling apparatus according to the invention may be realized such that the body flap is a vehicle body outer part, in particular a front flap or an engine hood, of the vehicle.

The vehicle according to the invention is in particular a motor vehicle and comprises the filling apparatus according to the invention. This results in the properties and advantages mentioned in connection with the filling apparatus according to the invention in the same way, and for this reason, to avoid repetitions, reference is made to the above embodiments in connection with the filling apparatus according to the invention.

Preferred embodiments of the invention will be described below with reference to the drawings.

DETAILED DESCRIPTION OF THE DRAWINGS

Figure 1:
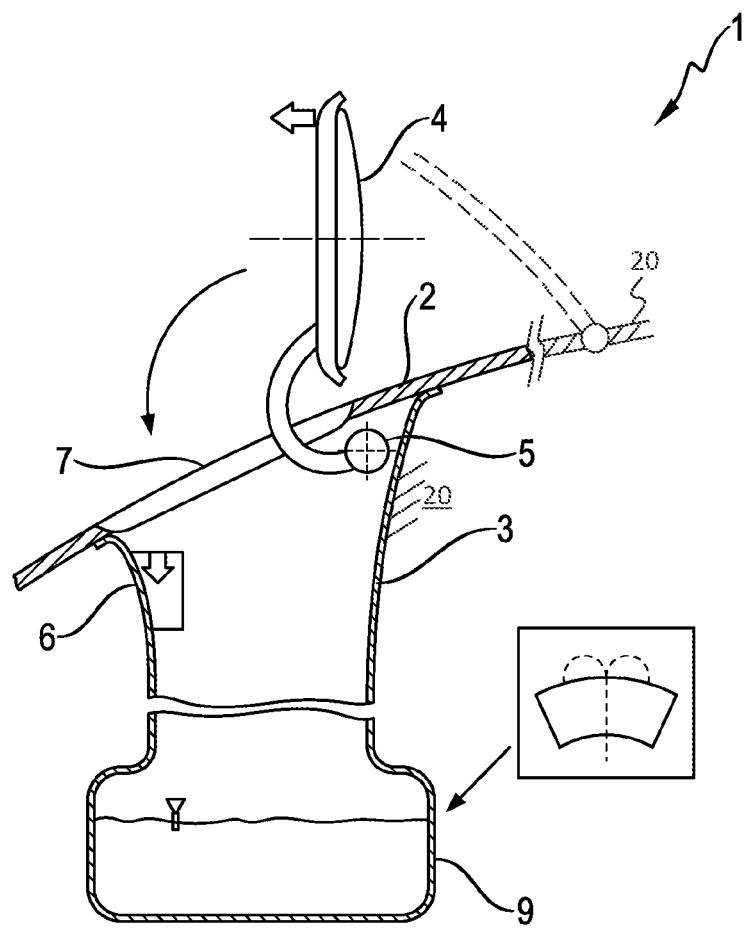
FIG. 1 shows, in a cross-sectional view, a schematic illustration of a filling apparatus according to a first embodiment of the invention.

FIG. 1 shows, in a cross-sectional view, a schematic illustration of a filling apparatus 1 according to a first embodiment of the invention.

A vehicle 20 according to the invention (not illustrated in more detail in FIG. 1) is in particular a motor vehicle and comprises the filling apparatus 1.

The filling apparatus 1 comprises a body flap 2, which forms, at least in sections, an outer skin of the vehicle and is configured to be pivoted between a first position and a second position (body flap 2 shown in dotted lines), which differs from the first position, wherein the body flap 2 has an opening 7, as illustrated in FIG. 1. In the illustrated case, the body flap 2 is a vehicle body outer part, in particular a front flap or an engine hood, of the vehicle.

The filling apparatus 1 furthermore comprises a device for opening and closing the opening 7 by way of a pivotable cover element 4 provided at the opening 7, and a filler neck 3, which is arranged in relation to the opening 7 such that the filler neck 3 can be filled with a fluid such as a windshield washer fluid via the opening 7 when the body flap 2 is situated in the first position. In particular, the body flap 2 is able to be pivoted between the first and second positions such that the body flap 2, in its first position, as illustrated in FIG. 1, is placed sealingly in abutment with the filler neck 3 and, in its second position, is remote from the filler neck 3. Here, the second position corresponds to a customary open position of the front flap or the engine hood, so that the engine compartment is accessible, while the first position is a customary closed position of the front flap or engine hood.

The filler neck 3 is connected to a container 9 for windshield wiper water such that the container 9 for windshield wiper water can be filled via the filler neck 3.

As can also be seen in FIG. 1, the cover element 4 is fastened pivotably to the body flap 2, wherein the filler neck 3 and the body flap 2 are fastened at the vehicle body side 20, that is to say to a vehicle body, which is not illustrated in detail in FIG. 1. Accordingly, when the body flap 2 is pivoted from the first position in the direction of the second position, the cover element 4 is moved along with the body flap 2, while the filler neck 3 remains positionally fixed in relation to the vehicle body.

The device for opening and closing comprises a bearing arrangement 5, which pivotably mounts the cover element 4 on the body flap 2. The device for opening and closing moreover comprises a locking device 6, which is fastened to the filler neck 3 and is configured to lock the cover element 4, situated in the position closing the opening 7, in the first position of the body flap 2. Here, in the position closing the opening 7, the cover element 4 bears sealingly against the body flap 2. The locking device 6 is preferably in the form of a so-called, customary push-push mechanism, so that a push-action actuation of the cover element 4 leads either to unlocking or to locking. In this case, it may also be provided that the locking device 6 can unlock only if a central locking system of the vehicle is in the unlocked state, that is to say allows access to the vehicle.

In this exemplary embodiment, an emblem 22 (not illustrated in more detail) is provided at an outer side of the cover element 4 such that the cover element is concealed or inconspicuous from a visual or design aspect.

Figure 2:
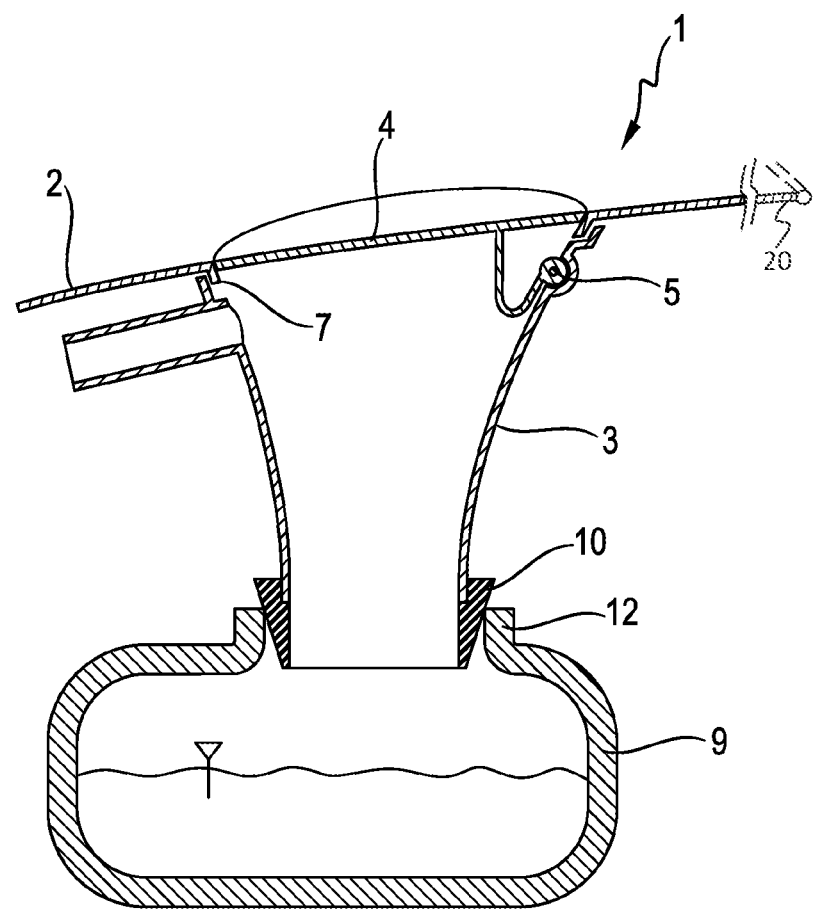
FIG. 2 shows, in a cross-sectional view, a schematic illustration of a filling apparatus according to a second embodiment of the invention.

FIG. 2 shows, in a cross-sectional view, a schematic illustration of a filling apparatus 1 according to a second embodiment of the invention. In the following description of the second embodiment, only the differences in relation to the first embodiment will be discussed. Here, in the description of the second embodiment, identical or similar elements or components in relation to the first embodiment are provided with identical or similar reference signs.

By contrast to the first embodiment, in the filling apparatus 1 according to the second embodiment, the filler neck 3 and the container 9 for windshield wiper water are designed as separate components. Here, the filler neck 3 is connected to the body flap 2 such that, when the body flap 2 is pivoted from the first position in the direction of the second position, the filler neck 3 and the cover element 4 are moved along with the body flap 2, while the container 9 for windshield wiper water remains positionally fixed in relation to the vehicle body. If the body flap 2 is moved from the second position back to the first position, a lower end portion or edge portion 10 of the filler neck 3 and an opening 12 of the container 9 for windshield wiper water come into engagement or into contact with one another in a sealing manner. In that regard, the lower end portion is provided with a conically formed sealing ring which is introduced sealingly via frictional and/or form-fitting engagement into the opening 12, as is illustrated in FIG. 2.

The features of the invention that are disclosed in the above description, in the drawings and in the claims may be essential to the realization of the invention both individually and in any desired combination.

What is claimed is:

1. A filling apparatus for a vehicle, comprising:
   a body flap, which forms, at least in sections, an outer skin of the vehicle and is configured to be pivoted between a first position and a second position, which first position is a closed position and which second position differs from the first position, wherein the body flap has an opening;
   a pivotable cover element provided at the opening by which the opening is opened and closed; and
   a filler neck, having an open end arranged in relation to the opening to form an open passage to a container positionally fixed with respect to the vehicle, such that the container is fillable with a fluid via the opening when the body flap is situated in the first position.

2. The filling apparatus according to claim 1, wherein the body flap is able to be pivoted between the first and second positions such that the body flap, in the first position, is placed in abutment with the filler neck and, in the second position, is remote from the filler neck.

3. The filling apparatus according to claim 2, wherein the body flap is able to be pivoted between the first and second positions such that the body flap, in the first position, is placed sealingly in abutment with the filler neck.

4. The filling apparatus according to claim 1, wherein
the cover element is fastened pivotably to the body flap, and
the filler neck and the body flap are able to be fastened at a vehicle body side.

5. The filling apparatus according to claim 1, wherein the cover element and/or the filler neck are fastened pivotably to the body flap, and the body flap is able to be fastened at a vehicle body side.

6. The filling apparatus according to claim 5, wherein at least one of:
(i) when the body flap is pivoted from the first position in the direction of the second position, the filler neck is moved along with the body flap, and
(ii) when the body flap is pivoted from the second position into the first position, the filler neck, by way of a lower end portion, comes into contact with an opening of the container in a sealing manner.

7. The filling apparatus according to claim 1, wherein a bearing arrangement pivotably mounts the cover element on the body flap.

8. The filling apparatus according to claim 7, wherein a locking device is fastened to the filler neck and is configured to lock the cover element when the cover element is situated in the position closing the opening in the first position of the body flap.

9. The filling apparatus according to claim 1, wherein a locking device is fastened to the filler neck and is configured to lock the cover element when the cover element is situated in the position closing the opening in the first position of the body flap.

10. The filling apparatus according to claim 1, wherein in the position closing the opening, the cover element bears sealingly against the body flap.

11. The filling apparatus according to claim 1, wherein an emblem is provided at an outer side of the cover element.

12. The filling apparatus according to claim 1, wherein the body flap is a vehicle body outer part.

13. The filling apparatus according to claim 1, wherein the body flap is a front flap or an engine hood of the vehicle.

14. A vehicle comprising a filling apparatus according to claim 1.

* * * * *